United States Patent [19]

Nettekoven

[11] Patent Number: 5,823,488

[45] Date of Patent: Oct. 20, 1998

[54] ARM/WRIST POSITIONING AND REST DEVICE

[76] Inventor: Bernard E. Nettekoven, Rte. 6, Box 644, Mankalo, Minn. 56001-9260

[21] Appl. No.: 812,534

[22] Filed: Mar. 8, 1997

[51] Int. Cl.⁶ .................................................. B68G 5/00
[52] U.S. Cl. .................. 248/118; 248/188.2; 248/349.1; 254/104; 403/84
[58] Field of Search .................................. 248/118, 118.1, 248/118.3, 118.5, 188.2, 187.1, 346.01, 346.05, 349, 349.1, 687, 918, 921; 403/84, 66, 164; 254/104, 42; 52/126, 712

[56] References Cited

U.S. PATENT DOCUMENTS

| | | | |
|---|---|---|---|
| 568,380 | 9/1896 | Theiring | 248/118.1 |
| 624,572 | 5/1899 | Sturgess | 403/84 |
| 655,284 | 8/1900 | Thier . | |
| 672,303 | 4/1901 | Williams | 403/84 |
| 940,113 | 11/1909 | Amundson | 254/42 |
| 1,045,984 | 12/1912 | King | 254/104 |
| 1,901,287 | 3/1933 | Corriveau | 267/52 |
| 2,013,192 | 9/1935 | Smith | 403/66 |
| 2,053,517 | 9/1936 | Crandall et al. | 248/687 |
| 2,123,484 | 7/1938 | Mafera | 254/104 |
| 2,170,690 | 8/1939 | Mafera | 254/104 |
| 2,248,715 | 7/1941 | Mafera | 254/104 |
| 2,405,889 | 8/1946 | Kennedy | 411/546 |
| 2,682,131 | 6/1954 | Matter | 248/188.3 |
| 2,709,571 | 5/1955 | Mafera | 254/104 |
| 2,819,037 | 1/1958 | Wilkin | 254/104 |
| 2,953,630 | 9/1960 | Cejka | 403/84 |
| 3,021,638 | 2/1962 | Kristek | 248/188.2 |
| 3,030,730 | 4/1962 | Costar | 248/188.2 |
| 3,414,908 | 12/1968 | Waggott et al. | 403/84 |
| 3,452,663 | 7/1969 | Machtig | 248/187.1 |
| 3,462,111 | 8/1969 | Stokes | 248/346.03 |
| 3,478,994 | 11/1969 | Ryall | 403/84 |
| 3,486,629 | 12/1969 | Slaga | 211/1.51 |
| 3,819,136 | 6/1974 | Finke | 248/188.2 |
| 3,847,324 | 11/1974 | Uchanski et al. | 229/1.5 H |
| 3,954,244 | 5/1976 | Gopstein | 248/349 |
| 3,984,075 | 10/1976 | Bahner et al. | 248/13 |
| 4,037,978 | 7/1977 | Connelly | 403/164 |
| 4,068,961 | 1/1978 | Ebner et al. | 248/921 |
| 4,073,454 | 2/1978 | Sauber | 248/188.2 |
| 4,135,335 | 1/1979 | Jensen | 52/126 |
| 4,625,489 | 12/1986 | Bogle | 52/712 |
| 4,776,548 | 10/1988 | Bezenek | 248/254 |
| 4,830,320 | 5/1989 | Bellows | 248/188.2 |
| 4,830,542 | 5/1989 | Bunnell et al. | 405/227 |
| 4,852,830 | 8/1989 | Howard et al. | 248/921 |
| 4,870,440 | 9/1989 | Frost | 248/188.2 |
| 5,037,050 | 8/1991 | Lin et al. | 248/921 |
| 5,195,705 | 3/1993 | Kline et al. | 248/118.3 |
| 5,340,075 | 8/1994 | Schriner | 248/346 |
| 5,492,292 | 2/1996 | Richards | 248/188.2 |
| 5,492,298 | 2/1996 | Walker | 248/346.01 |
| 5,573,218 | 11/1996 | Vaassen et al. | 248/371 |

*Primary Examiner*—Leslie A. Braun
*Assistant Examiner*—Tan Le
*Attorney, Agent, or Firm*—Dwight N. Holmbo

[57] ABSTRACT

An apparatus which reduces arm, wrist and shoulder stress and pain while using a computer mouse device. This apparatus includes an adjustable working surface which is capable of aligning the angle inclination as well as the angle of rotation of a mouse device user's hand, wrist and forearm with respect to the stationary working surface of the structure on which the apparatus is resting while operating the mouse device. The apparatus is adaptable to fit any adult size and is capable of use with either the left or right hand.

11 Claims, 4 Drawing Sheets

ARM/WRIST POSITIONING AND REST DEVICE

BACKGROUND OF THE INVENTION

1. Field of the Invention

The present invention relates generally to computer equipment and peripherals, and more particularly to a positioning device which reduces arm, wrist and shoulder stress when using a mouse while operating a computer.

2. Description of the Prior Art

It is now well accepted that computers are often used in conjunction with a manual manipulator mouse device to position a cursor indicator on a computer display such as a CRT. Generally, a mouse device is designed to be grasped by a human palm and moved about on a flat surface to cause the aforesaid display cursor to move about in a like manner.

Some types of mouse devices move using a downwardly oriented track ball against a surface which has an acceptably high coefficient of friction between the track ball and the surface on which it is moved, while other types of mouse devices have a laser interaction with a specialized board or otherwise have an electromagnetic relationship with a tablet. The track ball type mouse devices can typically be used with varying degrees of effectiveness on any surface. Normally, if such surfaces are not smooth or do not exhibit sufficiently high friction with respect to the track ball, the manipulative result on the cursor will be disjunctive and much additional physical effort will need be made by the mouse device user to place the cursor on exactly the right point. Such efforts are exasperating, often adversely affect work efficiency, and are known to sometimes cause arm, wrist and shoulder stress and pain.

The use of a mouse device pad will eliminate the lack of friction, but contemporary mouse device pads have a tendency to cause the mouse device user to extend their arm in a manner which causes the hand to lie in a flat horizontal plane rather than in a natural position of the hand which is generally at an angle with respect to a horizontal plane when one extends their arm. This unnatural position of the hand when using such a mouse device also adds to the aforesaid arm, wrist and shoulder stress and pain.

What is needed is an apparatus which reduces arm, wrist and shoulder stress and pain while using a computer mouse device. This needed apparatus should be capable of aligning the angle inclination and the angle of rotation of a mouse device user's hand, wrist and forearm with respect to the stationary working surface of the structure on which the apparatus is resting while operating the mouse device. The needed apparatus should also be adaptable to fit any adult size and be capable of use with either the left or right hand.

SUMMARY OF THE INVENTION

The present invention is directed to an arm, wrist and shoulder positioning apparatus which is capable of aligning a computer mouse device user's hand, wrist and forearm with respect to the stationary working surface of the structure on which the apparatus is resting while operating the mouse device, such that the computer mouse device user will experience either no or greatly reduced or arm, wrist and shoulder stress while operating the computer mouse device over prolonged periods of time. The positioning apparatus has a substantially flat adjustable working surface attached to a supporting structure creating a variable inclined plane. A mounting base is rotatably coupled to the supporting structure having the substantially flat adjustable working surface such that rotational movement of either or both the supporting structure and mounting base alters the angle of inclination and the angle of rotation between the inclined plane of the flat adjustable working surface and a horizontal plane to allow a mouse device user's wrist to operate a mouse device in a more natural and physically less stressful position. The supporting structure and mounting base can be rotatably coupled to each other via conventional mounting hardware, e.g. nuts, bolts, washer, or alternatively, can be rotatably coupled to each other via a quick-lock mechanism also serving as a friction brake to stabilize the aforesaid angular plane of the flat adjustable working surface.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
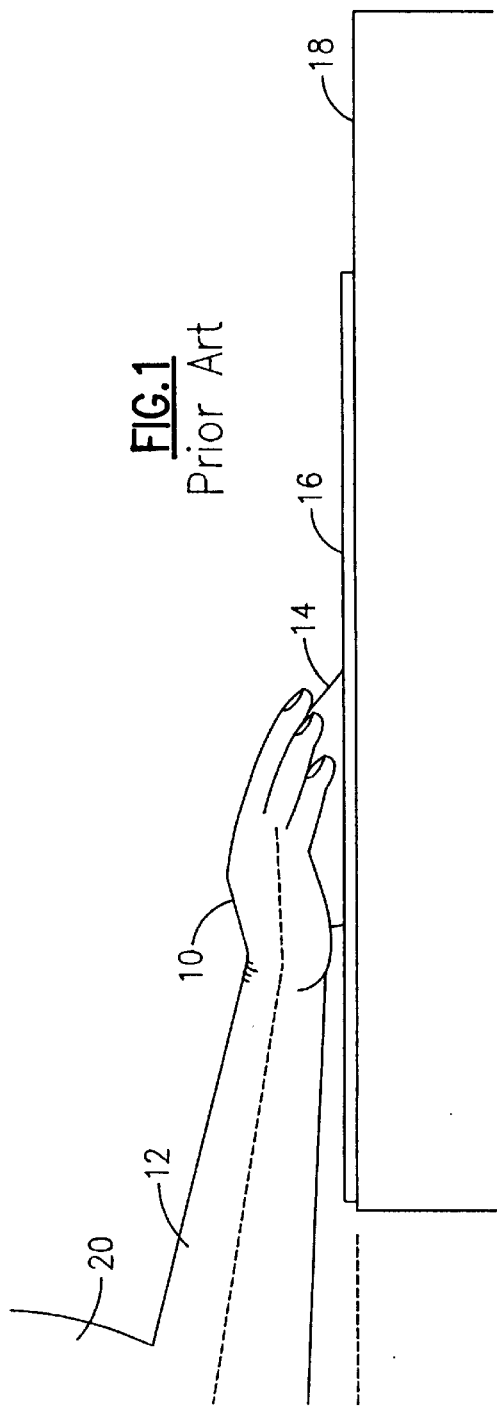
FIG. 1 illustrates a computer mouse device being used with a conventional mouse pad known in the prior art.

The preferred embodiments described herein below, address the long felt need by those in the computer equipment and peripheral industries to provide an apparatus capable of aligning a computer mouse device user's hand, wrist and forearm with respect to the stationary working surface of the structure on which the apparatus rests while operating the mouse device, such that the computer mouse device user will experience either no or greatly reduced or arm, wrist and shoulder stress while operating the computer mouse device over prolonged periods of time. FIG. 1 illustrates a computer mouse device 14 atop a mouse pad 16 which is placed upon a flat stationary working surface 18 such as a desk or table top. The computer mouse device 14 is being operated by a mouse device user's hand 10, forearm 12 and upper arm 20. The present inventor has recognized that such conventional use of computer mouse devices 14 causes an unnatural alignment of the computer mouse device user's hand 10 and forearm 12 in relation to the user's body. For example, when using a conventional mouse pad 16, the palm of the hand 10 is forced to rotate into a flat position with respect to a horizontal plane formed by the stationary working surface 18. Prolonged operation of a computer mouse device 14 with the hand 10 in the aforesaid flat position has been found by the present inventor to cause and/or contribute to the undesirable pain and stress caused by tendanitis and sore arms, shoulders and wrists.

Figure 2:
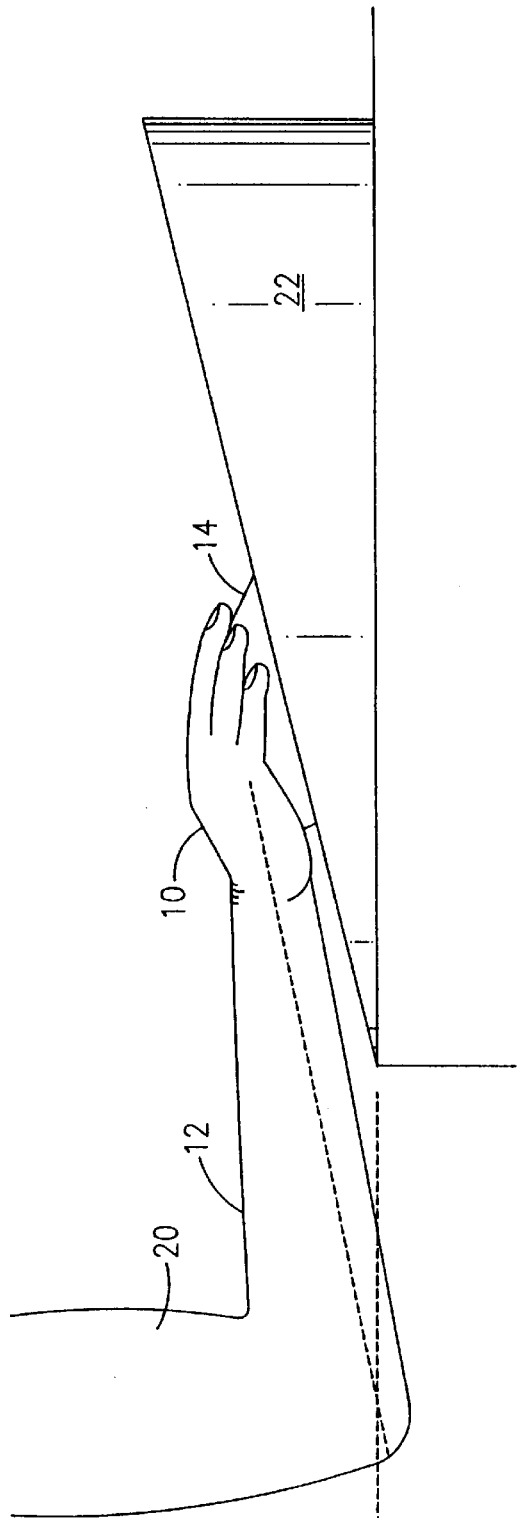
FIG. 2 illustrates a computer mouse device being used with an inclined mouse pad known in the prior art.

FIG. 2 illustrates one apparatus known in the prior art for repositioning of the hand when operating a computer mouse device 14. This apparatus is disclosed in U.S. Pat. No. 5,492,298, issued Feb. 20, 1996, to Walker, entitled *ERGONOMIC MOUSE PAD*. Although the apparatus disclosed and claimed in the '298 patent does position the hand 10, forearm 12 and upper arm 20 such that the angle of inclination of the hand 10 and forearm 12 is greater than zero degrees from a horizontal plane, the apparatus does not allow the angle of rotation formed between the palm of the hand 10 and a horizontal plane to be altered as desired by the computer mouse device user.

Figure 3:
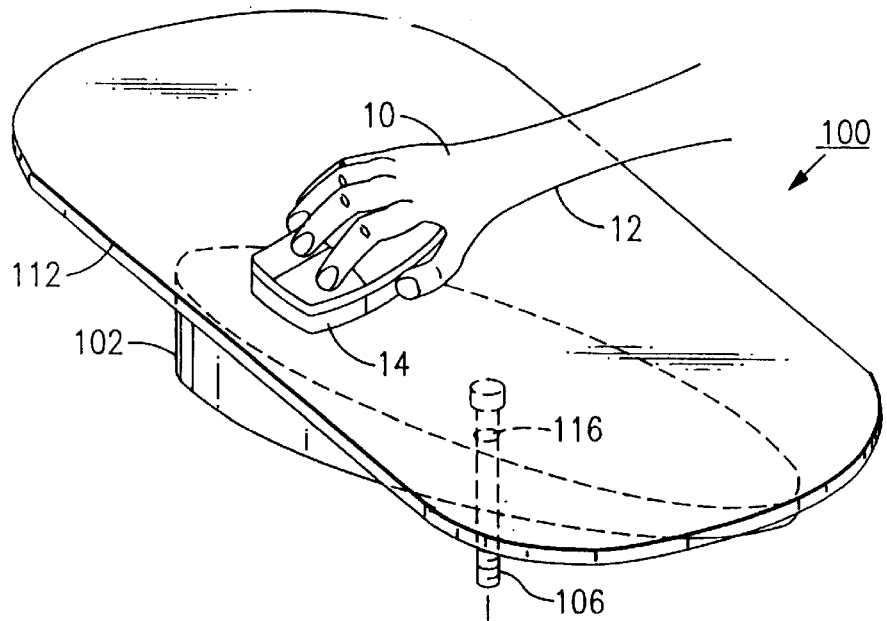
FIG. 3 a perspective view of one preferred embodiment for the present inventive arm/wrist positioning and rest apparatus including an adjustable planar working surface.

Looking now at FIG. 3, a perspective view of one preferred embodiment for the present inventive arm/wrist positioning and rest apparatus 100 including an adjustable planar working surface 112 is illustrated. The positioning and rest apparatus 100 has a hand and wrist supporting body 102 attached to the underside of the planar working surface 112. The apparatus 100 also has a mounting platform 104 preferably adapted to removably mate flush against the bottom of the hand and wrist supporting body 102. The hand and wrist supporting body 102 and mounting platform 104 are adapted to receive a coupling bolt 106 or other like device which is secured via a washer 110 and a nut 108. The nut 108 is preferably threaded onto the bolt 106 until the bottom surface of the hand and wrist supporting body 102 mates flush with the top surface of the mounting platform 104. Most preferably, a locking nut 108 is used to secure the hand and wrist supporting body 102 and mounting platform 104 such that a friction brake is formed between the supporting body 102 and mounting platform 104. In this manner, the supporting body 102 and mounting platform 104 can be rotated with respect to one another to alter the angle of inclination as well as the angle of rotation formed between a horizontal plane and the plane formed by the palm of the mouse device user's hand 10. It can readily be appreciated that the present invention is not limited to the exact embodiment illustrated in FIG. 3, and that the hand and wrist supporting body 102 and mounting platform 104 can be formed having substantially solid bodies or substantially hollow bodies. Further, it can be readily appreciated that although a bolt 106, washer 110 and nut 108 are used to couple the supporting body 102 and mounting platform 104, the present invention will also function without use of this hardware with appropriate modifications, e.g. use of high friction surfaces between the hand and wrist supporting body 102 and mounting platform 104 and any rod-like structure inserted and retained within orifices 114, 116 which allow the supporting body 102 and mounting platform 104 to be independently rotated with respect to one another.

Although the planar working surface 112 is depicted as having a particular shape, the shape of the planar working surface 112 can be altered to accommodate any desired aesthetic shape so long as the required rotational functionality between the hand and wrist supporting body 102 and the mounting platform 104 is retained.

With continued reference to FIG. 3, it can be seen that the upper surface of the hand and wrist supporting body 102 does not form a right angle with the sides of the supporting body 102. The bottom portion of the hand and wrist supporting body 102 as well as the top portion of the mounting platform 104 preferably form right angles with the sides of their respective structures 102, 104 to form mirror image mating surfaces with respect to each other. The lower surface of the mounting platform 104 also does not form a right angle with the sides of the mounting platform 104, but also forms a surface preferably identical to the upper surface of the hand and wrist supporting body 102.

Figure 4:
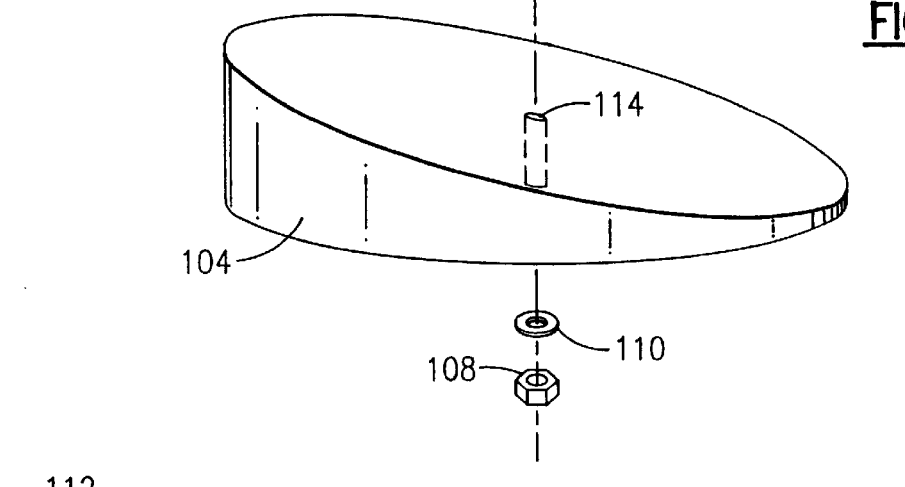
FIG. 4 is a side elevational view illustrating the apparatus depicted in FIG. 3 showing the adjustable planar working surface adjusted to its minimum incline position.

FIG. 4 is a side elevational view illustrating the arm/wrist positioning and rest apparatus 100 depicted in FIG. 3 showing the adjustable planar working surface 112 adjusted to its minimum incline position. This minimum incline position raises the elevation of the computer mouse device user's hand 10 and forearm 12 such that a linear relationship is formed between the hand 10 and forearm 12 via a common axis. The aforesaid minimum incline position is useful for some computer mouse device users who may not require rotation of the hand 10, but simply require elevating the hand 10 and forearm 12 to establish a physically less stressful working relationship between the hand 10 and forearm 12.

Figure 5:
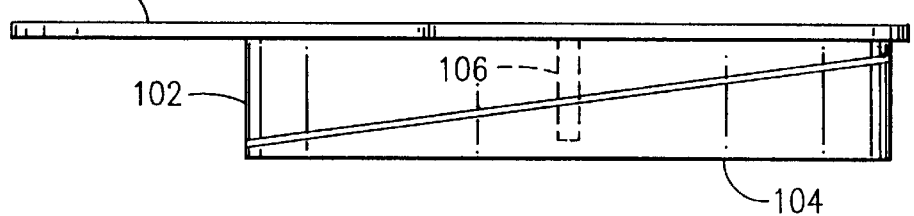
FIG. 5 is a side elevational view illustrating the apparatus depicted in FIG. 3 showing the adjustable planar working surface adjusted to its maximum incline position.

FIG. 5 is a side elevational view illustrating the arm/wrist positioning and rest apparatus 100 depicted in FIG. 3 showing the adjustable planar working surface 112 adjusted to its maximum incline position. When adjusted to its maximum incline position, a common axis is formed through the computer mouse device user's hand 10 and forearm 12 to form a linear relationship. The aforesaid maximum incline position is useful for those computer mouse device users who may require substantial rotation of the hand 10 to establish a physically less stressful working relationship between the hand 10 and forearm 12 when operating a computer mouse device 14 over prolonged periods of time as stated herein above. The angle of incline formed between the adjustable planar working surface 112 and a horizontal plane is adjusted simply by rotating either or both the hand and wrist supporting body 102 and the mounting platform 104 with respect to each other until the desired amount of hand 10 and forearm 12 rotation is achieved by the computer mouse device user.

Most preferably, the adjustable planar working surface 112 is about 9 inches in length by 7 inches in width although it will be appreciated that the present invention is not so limited and that numerous sizes and special shapes may just as well be utilized so long as the functionality directed to adjustable inclination angles and rotation angles are maintained. The present inventor has found that an adjustment range of about 0° to approximately 20° produced the desired reduction in physical stress and pain associated with prolonged use of a mouse device 14 for most computer mouse device users. This wide range of adjustability also functions to accommodate use of the present invention in combination with stationary working surfaces 18 which can be adjusted, e.g. drafting tables, light tables and the like. Preferably, the supporting body 102 and mounting platform 104 are molded of dense neoprene or the like, but alternatively may be constructed of any suitable material, e.g. wood, plastic, nylon, rubber, metal and/or combination thereof so long as the structural integrity and novel functionality of the inventive apparatus 100 is preserved. Most preferably, at least one anti-skid pad 202 is attached to the lower surface of the mounting platform 104 to prevent the present inventive positioning and rest apparatus 100 from slipping about on the stationary working surface 18.

Figure 6:
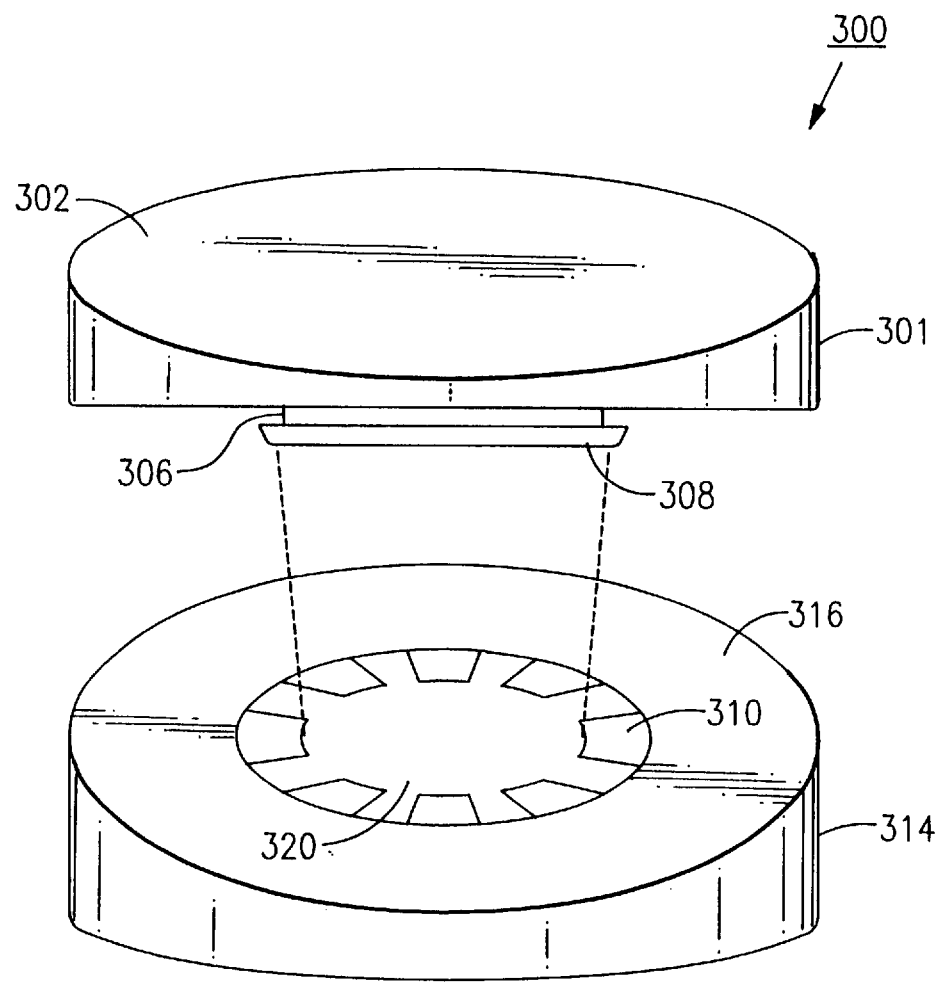
FIG. 6 is a frontal elevational view illustrating another preferred embodiment for the present inventive arm/wrist positioning and rest apparatus including a quick-lock mechanism and friction brake.

Moving now to FIG. 6, a front elevational view illustrating another preferred embodiment for the present inventive arm/wrist positioning and rest apparatus 300 including a combination quick-lock mechanism and friction brake 306, 308, 310 is shown. The position and rest apparatus 300 has a first cylindrical shaped body 301 and a second cylindrical shaped body 314. This embodiment 300 also has a rotationally adjustable planar working surface 302 which is formulated as an integral feature of the first cylindrical shaped body 301. The cylindrical shaped bodies 301, 314 each comprise an outer side surface, a top surface and a bottom surface. Preferably, at least one of the top and bottom surfaces for each cylindrical shaped body 301, 314 will not be right angular with respect to its adjacent side surface, and therefore will have a parabolic shape due to the angular disposition of the surface with respect to a right angular plane through the respective cylindrical shaped body 301, 314. The first cylindrical shaped body 301 also can be seen to have a lower neck 306 and collar 308 structure which forms one portion of the aforesaid combination quick-lock mechanism and friction brake 306, 308, 310. The second cylindrical shaped body 314 has a centered orifice 320 with radially dispersed protruding rigidly flexible tabs 310 disposed to angle inward toward the center of the orifice 320. The first cylindrical shaped body 302 is adapted to mate substantially flush with upper surface 316 of the second cylindrical shaped body 314 by forcing the cylindrical shaped bodies 301, 314 together until the collar 308 snaps past the rigidly flexible tabs 310 to lock the cylindrical shaped bodies 301, 314 into their fully functional position. Preferably the lower neck 306 is sized to press against the rigid flexible tabs 310 to form a friction brake when the cylindrical shaped bodies 301, 314 are locked together. Adjustments can then be made as desired simply by rotating the first cylindrical shaped body 301 until the desired angle of inclination and rotational position of the hand 10 and forearm 12 is obtained. The friction brake 306, 308, 320 acts to prevent accidental, inadvertent or unwanted changes to the aforesaid angle of inclination and rotational position of the hand 10 and forearm 12.

Figure 7:
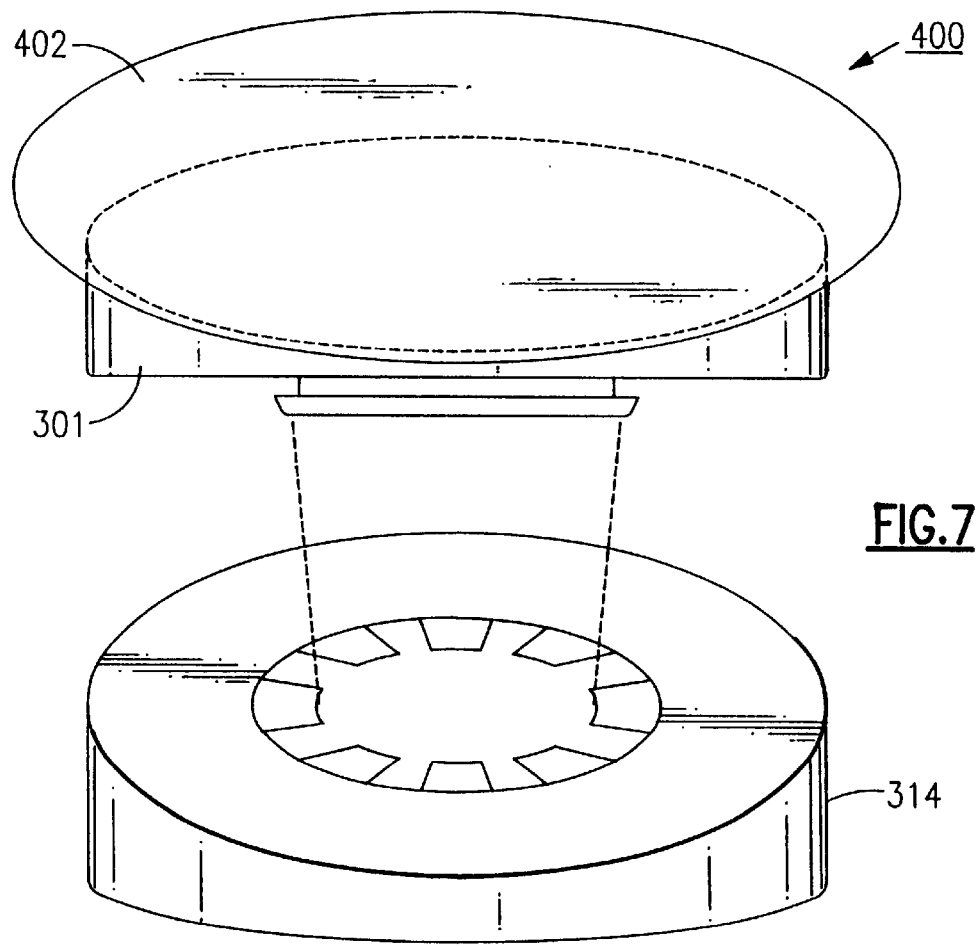
FIG. 7 is a frontal elevational view illustrating yet another preferred embodiment for the present inventive arm/wrist positioning and rest apparatus.

FIG. 7 is a front elevational view illustrating yet another preferred embodiment for the present inventive arm/wrist positioning and rest apparatus 400. The apparatus 400 depicted in FIG. 7 is identical with the device depicted in FIG. 6 with one exception. The device shown in FIG. 7 also includes a rotationally adjustable planar working surface 402 similar to the adjustable planar working surface 112 shown in FIGS. 3–5. It can be seen that the present invention can be configured to include an enlarged working surface 402 attached to the first cylindrical shaped body 301 or alternatively, can be configured to use the top portion of the first cylindrical shaped body 301 as an adjustable planar working surface 402.

Figure 8:
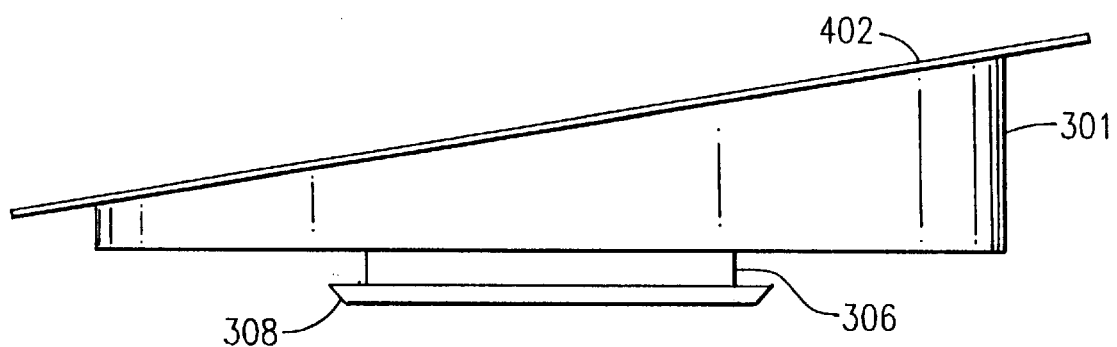
FIG. 8 is a side elevational view of the adjustable planar working surface portion of the arm/wrist positioning and rest apparatus shown in FIG. 7.

FIG. 8 is a side elevational view of the first cylindrical shaped body 301 portion of the arm/wrist positioning and rest apparatus 400 shown in FIG. 7 having a rotationally adjustable planar working surface 402. The lower neck 306 and collar 308 can be alternately configured in other sizes and variations in shape so long as the aforesaid friction braking functionality is preserved. The adjustable planar working surface 402 can likewise be configured in other sizes and variations in shape so long as the aforesaid functional adjustability of angle of inclination and rotation of the mouse device user's hand 10 is maintained.

This invention has been described herein in considerable detail in order to provide those skilled in the art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing from the spirit and scope of the present invention, as defined in the claims which follow. For example, it will be apparent to those skilled in the art that although particular component shapes, sizes and combinations of device components have been illustrated, that many other component shapes, sizes and combinations of components will also work to provide the intended functions of providing an arm/wrist positioning and rest device which accommodates adjustability of both, the angle of inclination of the computer mouse device user's hand 10 and forearm 12 as well as the angle of rotation of the mouse device user's hand 10 and forearm 12 relative to a horizontal plane.

I claim:

1. A hand and wrist positioning and rest apparatus comprising:

a first cylindrical shaped body having a cylindrical shaped side surface, a parabolic shaped planar top surface and a circular shaped planar bottom surface;

a second cylindrical shaped body having a cylindrical shaped side surface, a circular shaped planar top surface and a parabolic shaped planar bottom surface, wherein said first cylindrical shaped body is configured to be rotatably coupled to said second cylindrical shaped body such that said circular shaped planar bottom surface and said circular shaped planar top surface mate substantially flush against one another, and wherein said parabolic shaped planar top surface forms an angle of from about 0 degrees to about 20 degrees with said parabolic shaped planar bottom surface when said first and second cylindrical shaped bodies are rotatably coupled; and a friction brake configured to prevent accidental rotational movement between said first and second cylindrical shaped bodies.

2. The hand and wrist positioning and rest apparatus of claim 1 wherein said first and second cylindrical shaped bodies are adapted to be removably and rotatably coupled via a quick-lock mechanism.

3. The hand and wrist positioning and rest apparatus of claim 2 further comprising a substantially flat working surface attached to said parabolic shaped planar top surface.

4. The hand and wrist positioning and rest apparatus of claim 3 wherein said quick-lock mechanism comprises a neck having a first end attached to said circular shaped planar bottom surface and a second end attached to a collar, and further comprising a plurality of rigid flexible tabs disposed within said second cylindrical shaped body, said plurality of rigid flexible tabs adapted to removably receive said collar such that said rigid flexible tabs are urged against said neck.

5. A hand and wrist positioning and rest apparatus comprising:

a mounting platform having an outer side surface, an inclined planar bottom surface and a right angular planar top surface;

a hand and wrist supporting body having an outer side surface, an inclined planar top surface and a right angular planar bottom surface, wherein said mounting platform is adapted to be rotatably coupled to said hand and wrist supporting body such that said right angular planar bottom surface and said right angular planar top surface mate substantially flush against one another, and further wherein said inclined planar top surface forms an angle of from about 0 degrees to about 20 degrees with said inclined planar bottom surface when said mounting platform and said hand and wrist supporting body are rotatably coupled; and a friction brake configured to prevent accidental rotational movement between said mounting platform and hand and wrist supporting body.

6. The hand and wrist positioning and rest apparatus of claim 5 wherein said mounting platform and said hand and wrist supporting body are adapted to be removably and rotatably coupled via a quick-lock mechanism.

7. The hand and wrist positioning and rest apparatus of claim 6 further comprising a substantially flat working surface attached to said inclined planar top surface.

8. The hand and wrist positioning and rest apparatus of claim 7 wherein said quick-lock mechanism comprises a neck having a first end attached to said right angular planar bottom surface and a second end attached to a collar, and further comprising a plurality of rigid flexible tabs disposed within said hand and wrist supporting body, said plurality of rigid flexible tabs adapted to removably receive said collar such that said rigid flexible tabs are urged against said neck.

9. A hand and wrist positioning and rest apparatus comprising:

a mounting base having an outer side surface, an inclined planar top surface and a right angular planar bottom surface;

a hand and wrist supporting platform having an outer side surface, an inclined planar bottom surface and a right angular planar top surface, wherein said mounting base is configured to be rotatably coupled to said hand and wrist supporting platform such that said inclined planar bottom surface and said inclined planar top surface mate substantially flush against one another, and further wherein said right angular planar top surface forms an angle of from about 0 degrees to about 20 degrees with said right angular planar bottom surface when said mounting base and said hand and wrist supporting platform are rotatably coupled; and a braking means having at least one friction brake tab configured to prevent accidental rotational movement between said mounting base and said hand and wrist supporting platform.

10. The hand and wrist positioning and rest apparatus of claim 9 further including a snap-fit collar for removably and rotatably coupling said mounting base to said hand and wrist supporting platform.

11. The hand and wrist positioning and rest apparatus of claim 10 further comprising a substantially flat working surface attached to said right angular top surface.

* * * * *